United States Patent
Cho et al.

(10) Patent No.: US 9,760,257 B2
(45) Date of Patent: Sep. 12, 2017

(54) INSTALLATION GUIDE SYSTEM FOR AIR CONDITIONER AND METHOD OF USING THE SAME

(71) Applicant: LG ELECTRONICS INC., Seoul (KR)

(72) Inventors: Sangeun Cho, Changwon-si (KR); Shinae Kang, Changwon-si (KR); Jungyul Park, Changwon-si (KR); Haerim Lee, Changwon-si (KR); Mingyu Park, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 371 days.

(21) Appl. No.: 14/362,024

(22) PCT Filed: Nov. 28, 2012

(86) PCT No.: PCT/KR2012/010138
§ 371 (c)(1),
(2) Date: May 30, 2014

(87) PCT Pub. No.: WO2013/081361
PCT Pub. Date: Jun. 6, 2013

(65) Prior Publication Data
US 2014/0380221 A1      Dec. 25, 2014

(30) Foreign Application Priority Data

Nov. 30, 2011   (KR) .................. 10-2011-0126768

(51) Int. Cl.
*G06F 17/50* (2006.01)
*G06F 3/0484* (2013.01)
*F24F 11/00* (2006.01)

(52) U.S. Cl.
CPC ........ *G06F 3/0484* (2013.01); *G06F 17/5004* (2013.01); *F24F 2011/0091* (2013.01)

(58) Field of Classification Search
CPC .................................................. G06F 17/5004
(Continued)

(56) References Cited

U.S. PATENT DOCUMENTS

| 5,557,537 | A | 9/1996 | Normann |
| 6,232,972 | B1 | 5/2001 | Arcuri |

(Continued)

FOREIGN PATENT DOCUMENTS

| CN | 1467443 | 1/2004 |
| CN | 101025716 | 8/2007 |

(Continued)

OTHER PUBLICATIONS

User's Manual—TRACE® 700 Building Energy and Economic Analysis—version 6.2, Trane, available at http://online.sfsu.edu/ascheng/ENGR465S11/docs/UsersManual.pdf (2010), pp. i to 1-1, 4-2 to 4-7, 4-15 to 4-20, 4-34 to 4-39, 5-33 to 5-42, 6-3 to 6-19, and 6-51 to 6-73.*

(Continued)

*Primary Examiner* — Doon Chow
*Assistant Examiner* — Conrad Pack
(74) *Attorney, Agent, or Firm* — KED & Associates, LLP

(57) ABSTRACT

An installation guide system for air conditioner and a method of using the same are provided. The system includes: a memory unit storing drawing information on a building where an air conditioner is to be installed; a display unit providing a user interface to design an arrangement of the air conditioner; a drawing displaying unit provided on the display unit, where at least one apparatus constituting the air conditioner is inserted; an effectiveness inspection selecting unit performing a verification on an capacity of an (Continued)

apparatus constituting the air conditioner on the basis of the design information on the air conditioner; and a system inspection displaying unit displaying a verification result on whether the capacity of the apparatus is within a predetermined reference range.

12 Claims, 13 Drawing Sheets

(58) Field of Classification Search
USPC .......................................................... 715/771
See application file for complete search history.

(56) References Cited

U.S. PATENT DOCUMENTS

| | | | |
|---|---|---|---|
| 6,477,518 B1* | 11/2002 | Li | G06F 17/5095 706/45 |
| 8,099,260 B2* | 1/2012 | Kfouri | G06F 17/5018 703/1 |
| 8,606,554 B2* | 12/2013 | Zimmermann | G05B 17/02 700/276 |
| 8,762,236 B1* | 6/2014 | Shirey | G06Q 40/06 705/35 |
| 2002/0075328 A1 | 6/2002 | Letzelter | |
| 2003/0074164 A1* | 4/2003 | Simmons | B60H 1/00642 703/1 |
| 2003/0125826 A1 | 7/2003 | Holman | |
| 2005/0256693 A1 | 11/2005 | Meisenecker | |
| 2007/0143451 A1 | 6/2007 | Huth | |
| 2007/0219764 A1* | 9/2007 | Backe | G06F 17/5004 703/6 |
| 2008/0077512 A1 | 3/2008 | Grewal | |
| 2009/0057425 A1 | 3/2009 | Sullivan | |
| 2009/0057426 A1 | 3/2009 | Sullivan | |
| 2009/0076779 A1 | 3/2009 | Simmons et al. | |
| 2009/0271154 A1* | 10/2009 | Coad | F24F 11/0086 703/1 |
| 2009/0307255 A1 | 12/2009 | Park | |
| 2009/0327942 A1 | 12/2009 | Eldridge | |
| 2011/0209081 A1* | 8/2011 | Chen | G06F 17/50 715/771 |
| 2011/0276167 A1 | 11/2011 | Schmidtke | |
| 2012/0029661 A1 | 2/2012 | Jones | |

FOREIGN PATENT DOCUMENTS

| | | |
|---|---|---|
| CN | 101464022 | 6/2009 |
| CN | 101673315 | 3/2010 |
| CN | 101923587 | 12/2010 |
| CN | 102033992 | 4/2011 |
| JP | 07-087557 A | 3/1995 |
| JP | 11-053408 A | 2/1999 |
| JP | 2002-109309 A | 4/2002 |
| JP | 2007-108903 A | 4/2007 |
| WO | WO 2007/106873 | 9/2007 |

OTHER PUBLICATIONS

Chinese Office Action dated Jun. 1, 2016.
Chinese Office Action dated Jan. 18, 2016. (English translation).
International Search Report dated Jan. 29, 2013 issued in Application No. PCT/KR2012/010138.
U.S. Office Action issued in U.S. Appl. No. 14/361,960 dated Mar. 28, 2017.
U.S. Office Action dated Oct. 20, 2016 issued in U.S. Appl. No. 14/361,960.
U.S. Appl. No. 14/361,960, filed May 30, 2014.
U.S. Office Action issued in U.S. Appl. No. 14/361,960 dated Jun. 12, 2017.

* cited by examiner

[Fig. 1]

Fig. 2
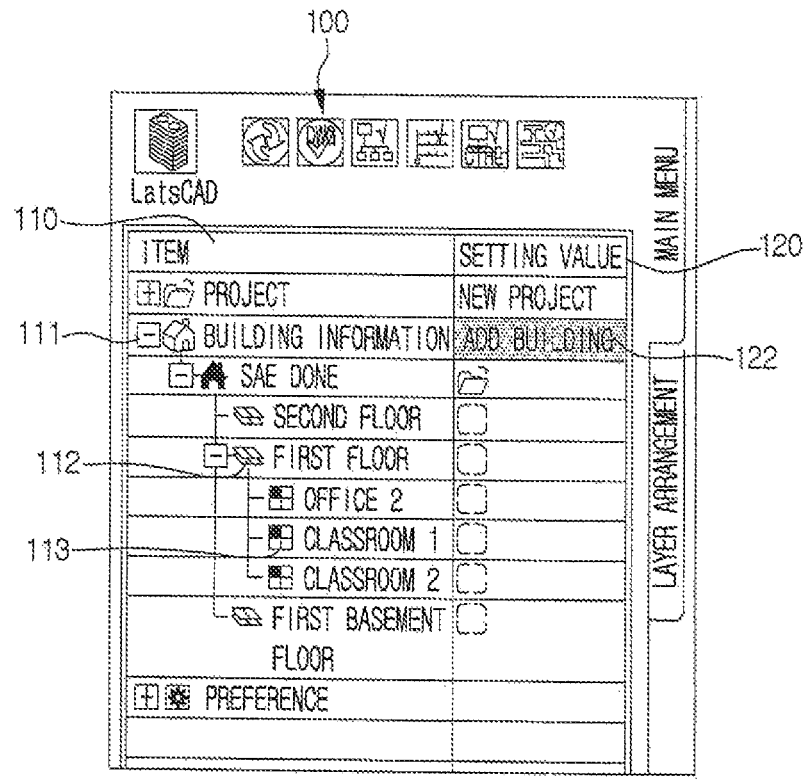
[Fig. 3]
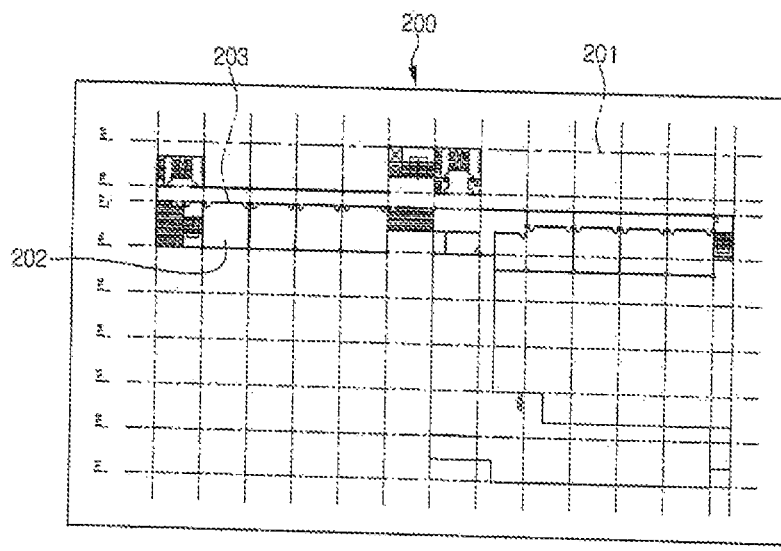

[Fig. 4]
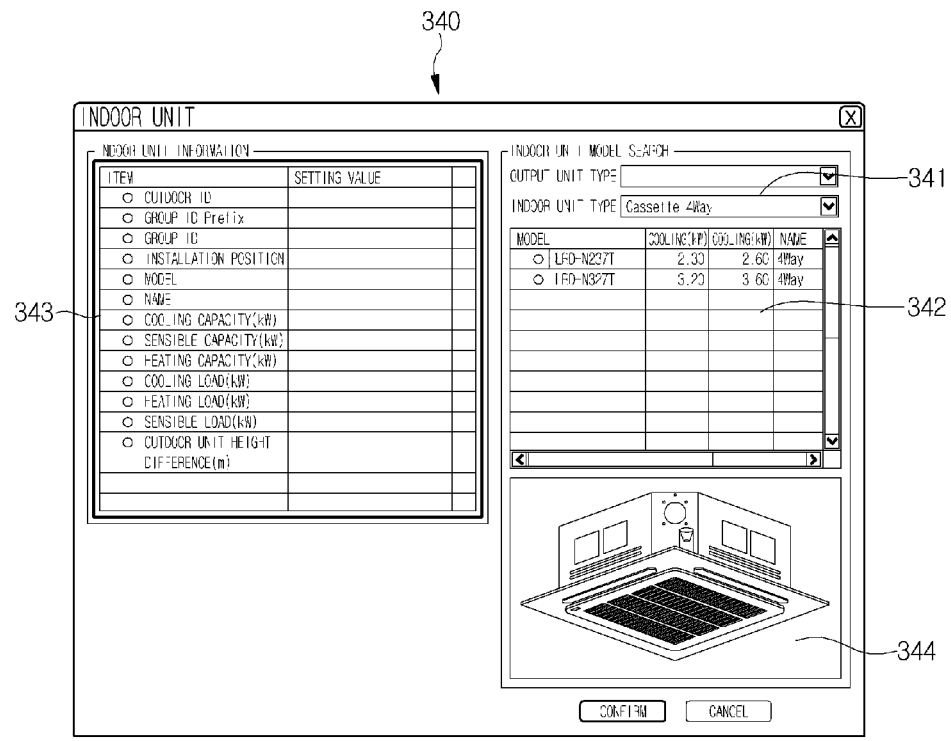
[Fig. 5]
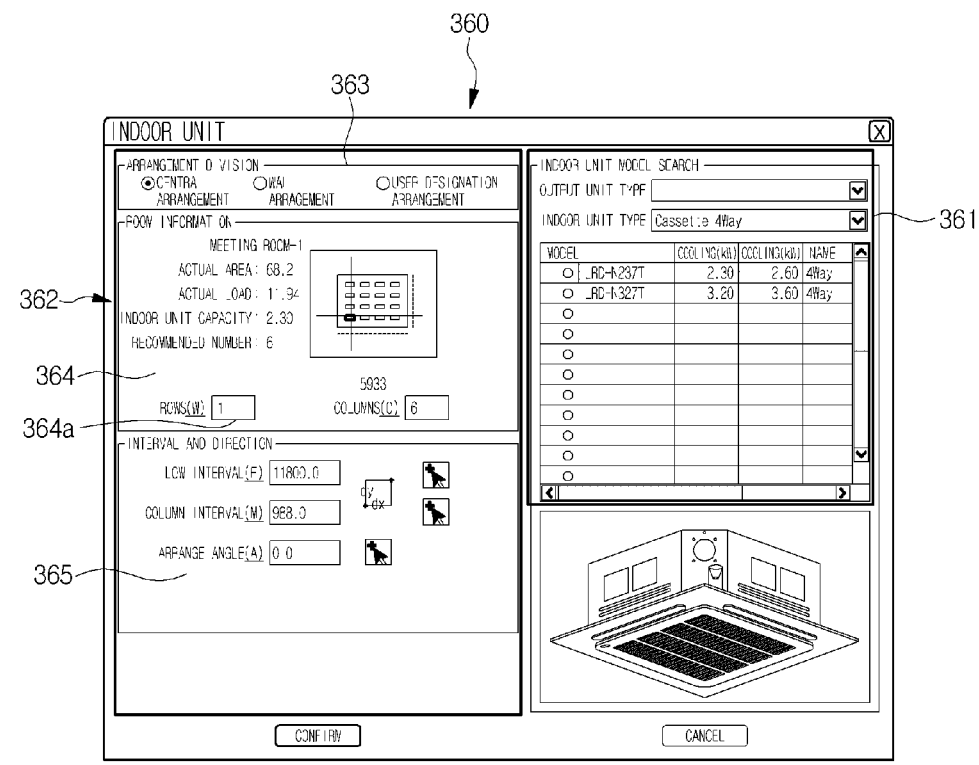

[Fig. 6]

[Fig. 7]
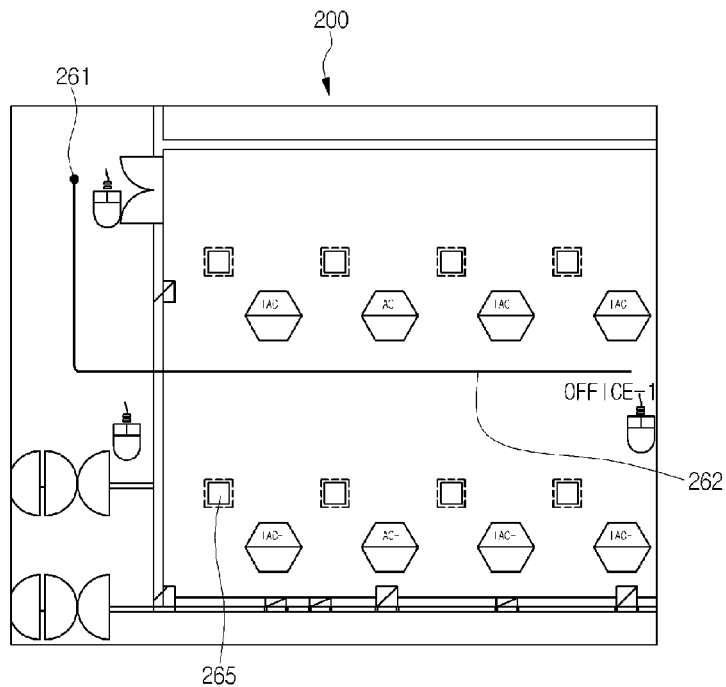
[Fig. 8]
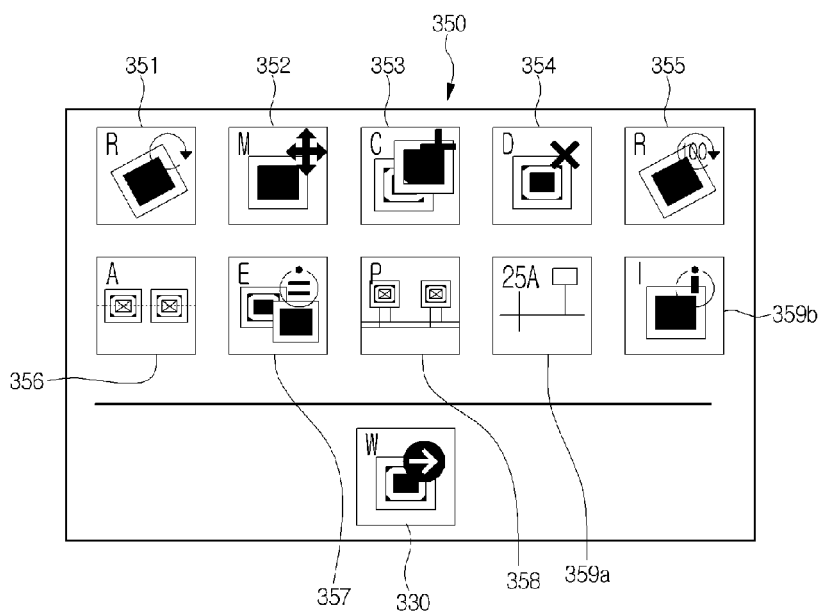
[Fig. 9]
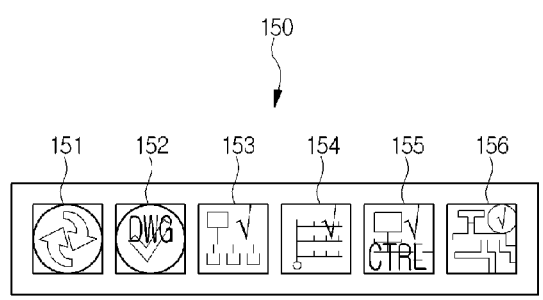

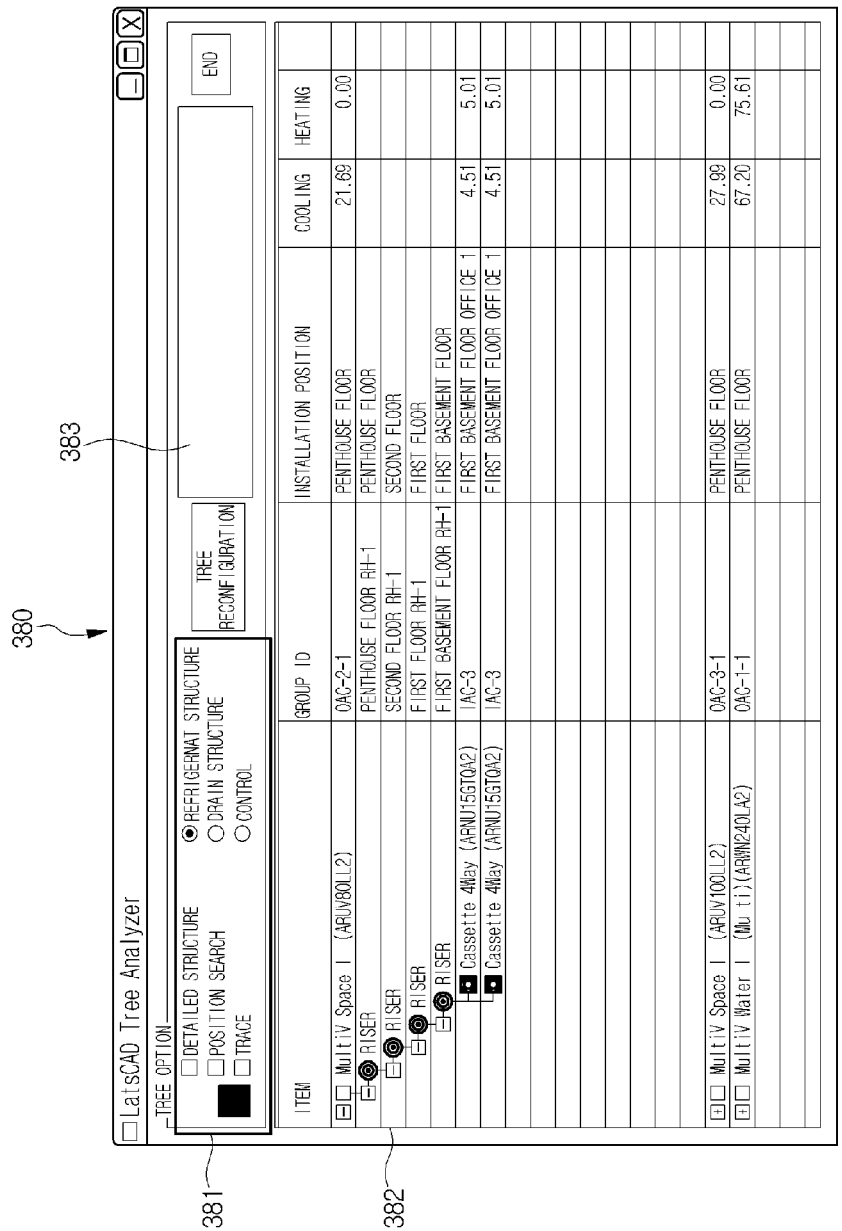
[Fig. 10]

[Fig. 11]

| ITEM | GROUP ID | INSTALLATION POSITION | COMBINATION RATIO(%) | COOLING | HEATING | Pipe | Syst... | CHECK TIME |
|---|---|---|---|---|---|---|---|---|
| ☑ Multiv III:ARUN120LT3 | OAC-1-1 | PENTHOUSE FLOOR | 126.19 | 37.70 | 47.71 | ☑ | ☑ | 2011-09-21 |
| ☑ Multiv III:ARJV280LT3 | OACc-2-1 | PENTHOUSE FLOOR | 126.70 | 88.04 | 0.00 | ☑ | ☑ | 2011-09-21 |
| ☑ Multiv Super II:LRP-N1608DP | OAC-3-1 | PENTHOUSE FLOOR | 123.13 | 17.54 | 19.23 | ☑ | ☑ | 2011-09-21 |

CAPACITY VERIFICATION RESULT

| CONTENTS | LIMIT | CURRENT VALUE (MAXIMUM VALUE:SELECTED APPARATUS) |
|---|---|---|
| TOTAL PIPE LENGTH | 1000.0 m | 68.7 m |
| LONGEST PIPE LENGTH (EQUIVALENT LENGTH) | 200.0 m | 45.9 m:ARNU36GTNC2[i1] |
| LONGEST EQUIVALENT PIPE LENGTH AFTER FIRST BRANCHED PIPE | 40.0 m | 31.3 m:ARNU36GTNC2[i1] |
| HEIGHT DIFFERENCE (ABOVE OUTDOOR UNIT) | 110.0 m | |
| HEIGHT DIFFERENCE (BELOW OUTDOOR UNIT) | 110.0 m | 0.8 m:ARNU36GTNC2[i1] |
| HEIGHT DIFFERENCE (BETWEEN INDOOR UNITS) | 15.0 m | 0.0m:ARNU36GTNC2[i1]-ARNU36GTNC2[i1] |
| LONGEST PIPE LENGTH (MOUNTING) | 150.0 m | 43.9m:ARNU36GTNC2[i1] |

ARUN120LT3 : SYSTEM INSPECTION IS SUCCESSFULLY COMPLETED

CAPACITY VERIFICATION MODE
○ COOLING
○ HEATING
● General
○ Conditional

COMBINATION RATIO RANGE
MAXIMUM VALUE 200.0 %
MINIMUM VALUE 50.0 %

SYSTEM ANALYSIS
REPORT OUTPUT  Default
APPARATUS TABLE
APPARATUS SELECTION TABLE
BMS OUTPUT
ATTRIBUTE INFORMATION

CONFIRM

[Fig. 12]
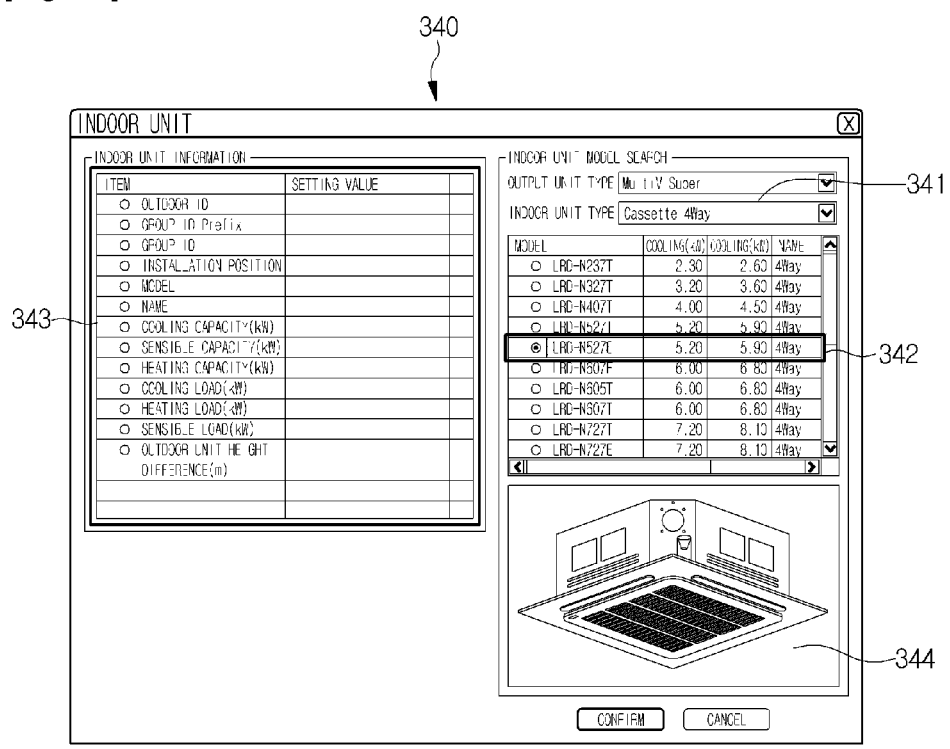

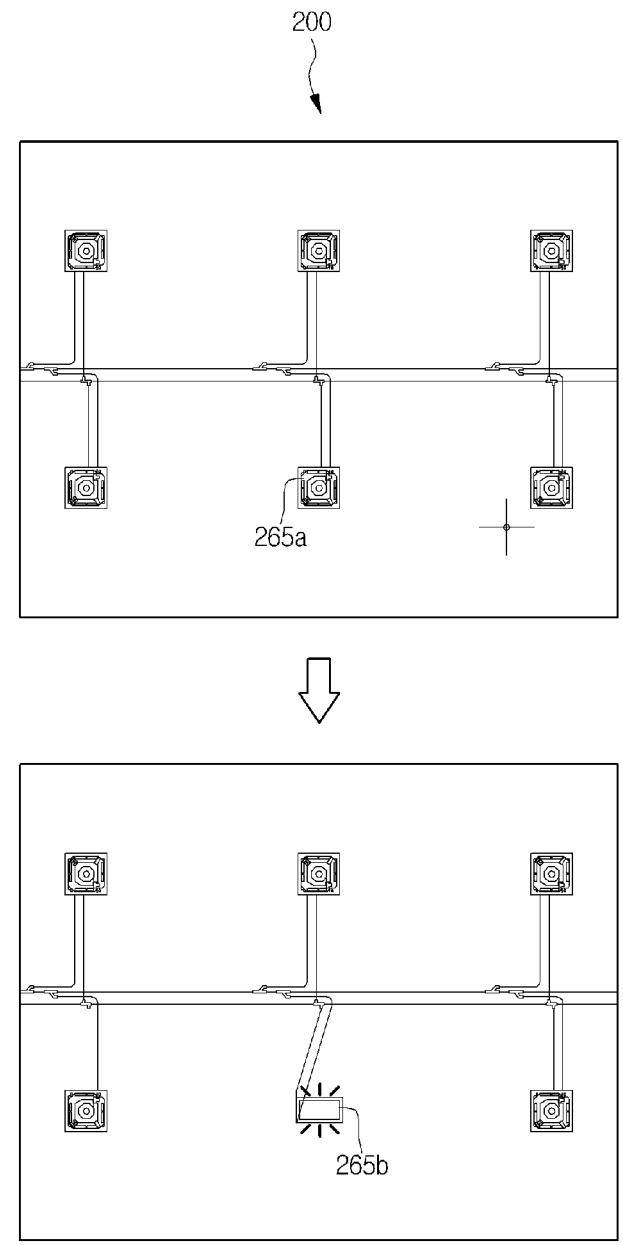

[Fig. 14]
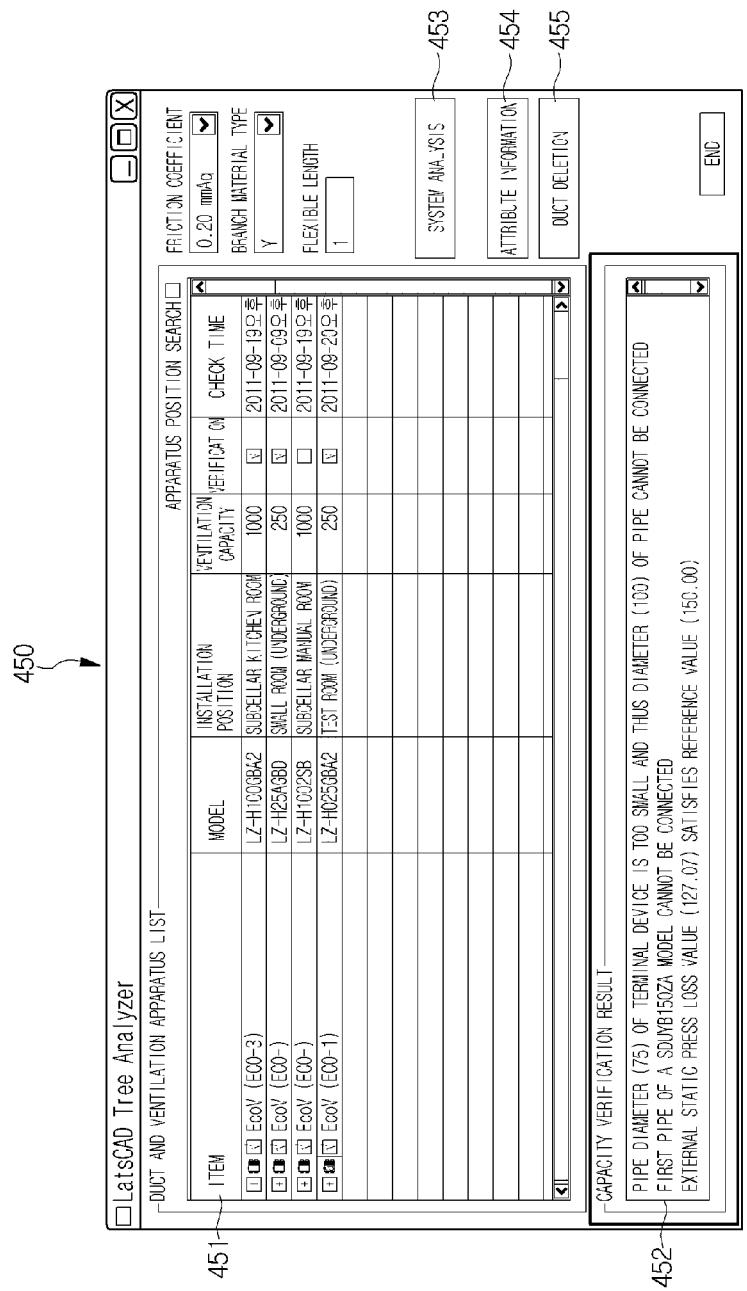

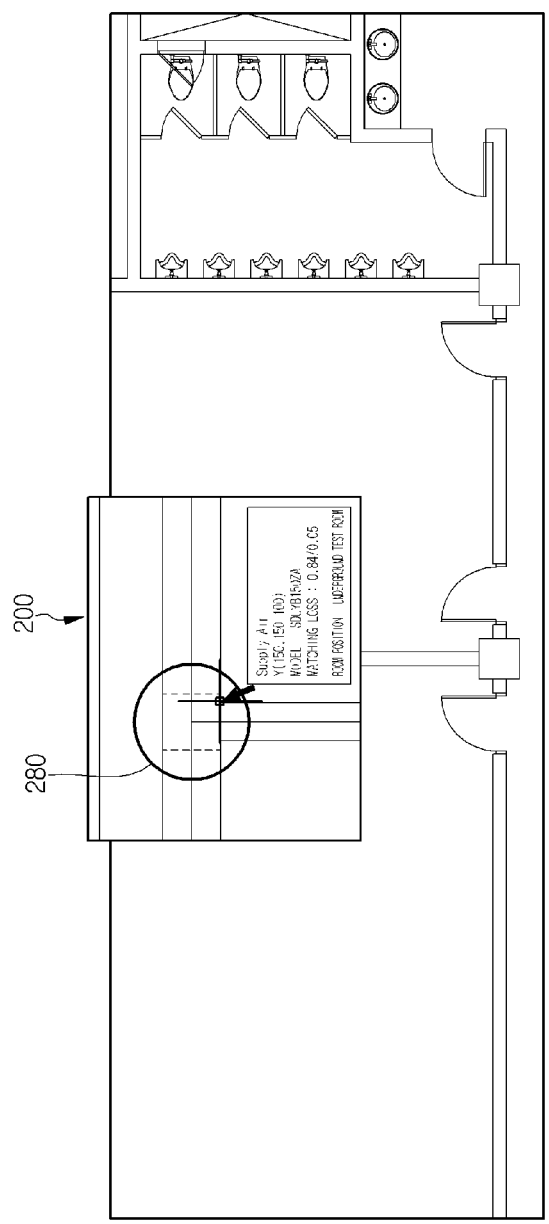
[Fig. 15]

[Fig. 16]
[Fig. 17]
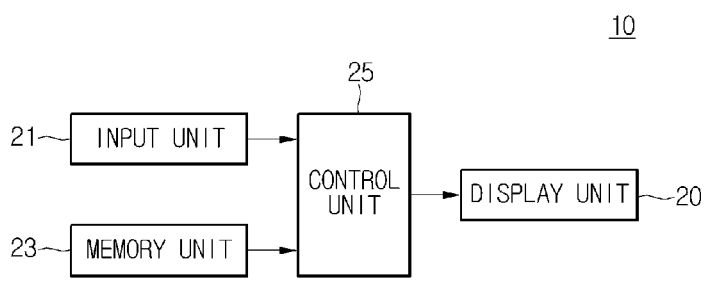

[Fig. 18]
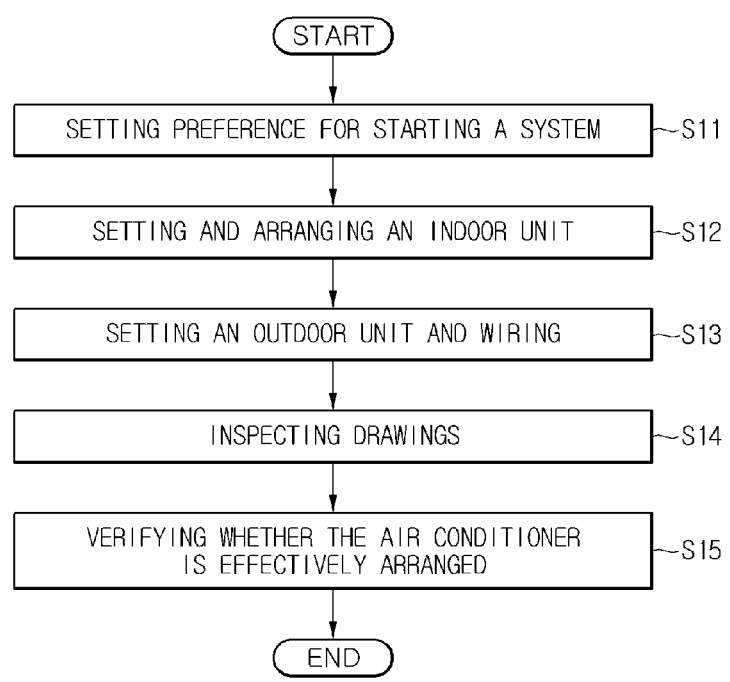

INSTALLATION GUIDE SYSTEM FOR AIR CONDITIONER AND METHOD OF USING THE SAME

CROSS-REFERENCE TO RELATED PATENT APPLICATIONS

This application is a U.S. National Stage Application under 35 U.S.C. §371 of PCT Application No. PCT/KR2012/010138, filed Nov. 28, 2012, which claims priority to Korean Patent Application No. 10-2011-0126768, filed Nov. 30, 2011.

TECHNICAL FIELD

The present disclosure relates to an installation guide system for air conditioner and a method of using the same.

BACKGROUND ART

An air conditioner is a home appliance for maintaining indoor air to be in the most appropriate state according to the purposes and objectives. For example, the air conditioner adjusts indoor air to be in a cool air-conditioned state in summer, adjusts indoor air to be in a warm air-conditioned state in winter, adjusts indoor humidity, and adjusts indoor air to be in a pleasant and clean state.

In more detail, in relation to the air conditioner, a refrigeration cycle is driven to perform refrigerant compression, condensation, expansion and evaporation processes, and accordingly, an indoor space cooling or heating operation is performed.

According to whether an indoor unit and an outdoor unit are separated, such an air conditioner is divided into a separate-type air conditioner (where an indoor unit and an outdoor unit are separated from each other) and an integrated-type air conditioner (where an indoor unit and an outdoor unit are integrated into one unit). The outdoor unit includes an outdoor heat exchanger for exchanging outdoor air and the indoor unit includes an indoor heat exchanger for exchanging indoor air. The air conditioner may operate to switch to a cooling mode or a heating mode.

In relation to the air conditioner, a plurality of indoor units or outdoor units may be installed at one building. Especially, in the case of a commercial air conditioner, a high capacity outdoor unit may be arranged at the outside of a building, and indoor units may be installed at a plurality of spaces in each floor of the building.

In relation to a related art air conditioner, a proper number of outdoor units or indoor units are designed to be installed in consideration of the size and structure of a building and the building capacity.

In the process of building design, a proper number of outdoor units or indoor units are selected in consideration of the condition of the building, and also, the arrangement of a refrigerant pipe, a branched pipe, or a drain pipe and a configuration of a controller need to be considered.

However, according to a related art process of designing an air conditioner in a building, as a design drawing of the building and an installation drawing of the air conditioner follow different workflows, the drawings do not match each other. Therefore, designing a building and installing an air conditioner may not be easily performed.

Moreover, since communication between parties is not effectively made on installation information on the air conditioner (for example, building information or capacity of an air conditioner), an actually required number of indoor units or outdoor units are not installed or refrigerant pipes are not installed at the proper positions.

As mentioned above, when the air conditioner is not properly installed in a building, cooling and heating efficiencies are poor and failures occur during the use of the air conditioner.

DISCLOSURE OF INVENTION

Technical Problem

The embodiments provide an installation guide system for air conditioner in order to guide proper installation of an air conditioner and a method of using the same.

Solution to Problem

In one embodiment, An installation guide system for air conditioner includes: a memory unit storing drawing information on a building where an air conditioner is to be installed; a display unit providing a user interface to design an arrangement of the air conditioner; a drawing displaying unit provided on the display unit, where at least one apparatus constituting the air conditioner is inserted; an effectiveness inspection selecting unit performing a verification on an capacity of an apparatus constituting the air conditioner on the basis of the design information on the air conditioner; and a system inspection displaying unit displaying a verification result on whether the capacity of the apparatus is within a predetermined reference range.

In another embodiment, a method of using an installation guide system for air conditioner includes: executing predetermined information to use the installation guide system for air conditioner; displaying a display unit with a drawing displaying unit; designing an air conditioner by inserting an apparatus constituting the air conditioner on the drawing displaying unit; and performing an effectiveness inspection in relation to whether a capacity of the apparatus is within a reference range.

The details of one or more embodiments are set forth in the accompanying drawings and the description below. Other features will be apparent from the description and drawings, and from the claims.

Advantageous Effects of Invention

According to an embodiment, in relation to an installation guide system of an air conditioner, the installation environment of a building is stored from an actual drawing relating to the building, and according thereto, the selection or arrangement of an air conditioner proper for the stored installation environment can be made. Therefore, an air conditioner optimized for a building's environment can be installed.

Additionally, on the basis of building space information and usage information (for example, generated calorie information), necessary cooling and heating capacity is calculated, and the number of indoor units to be used and the capacity of an outdoor unit are determined. Therefore, an installation process of an air conditioner can be easy.

Additionally, while an indoor unit and an outdoor unit are arranged, after a main pipe connecting them is wired, a branched part and a branched pipe may be automatically wired, so that a pipe design can be easily completed.

Additionally, after a simulation on the installation of an air conditioner is completed, the drawing and system inspection process are performed. Therefore, whether installation information on the designed air conditioner is appropriate can be verified. If the installation information is not proper, a corresponding error can be confirmed and edited.

Additionally, when the system inspection result includes errors, since reselection of an apparatus for resolving errors is automatically made, so that design can be easy.

Additionally, since installation information on the designed and verified air conditioner is provided to a customer (for example, a building owner or an installation shop) in a report form (for example, Installation reports and apparatus schedules), the customer can easily confirm the installation information of the air conditioner.

Additionally, as an installation guide system of an air conditioner is provided as a drawing program, a designer can easily manipulate it. In more detail, a main menu that you can see installation information and product information at a glance is displayed on a display unit of the system, and a result that a detailed menu of the main menu is selected can be confirmed in the drawing. Therefore, a design process can be accurately performed.

BRIEF DESCRIPTION OF DRAWINGS

FIG. 2 is a view illustrating a configuration of an installation information displaying unit according to an embodiment of the present invention.

FIG. 3 is a view illustrating a drawing displaying unit having a room area configured according to an embodiment of the present invention.

FIG. 4 is a view illustrating a configuration of an indoor type displaying unit according to an embodiment of the present invention.

FIG. 5 is a view illustrating a configuration of an indoor unit automatic arrangement displaying unit according to an embodiment of the present invention.

FIG. 6 is a view illustrating a configuration of an outdoor unit type displaying unit according to an embodiment of the present invention.

FIG. 7 is a view illustrating a drawing displaying unit when a main pipe is wired according to an embodiment of the present invention.

FIG. 8 is a view illustrating a configuration of an edit toolbar displaying unit according to an embodiment of the present invention.

FIG. 9 is a view illustrating a configuration of a control toolbar displaying unit according to an embodiment of the present invention.

FIG. 10 is a view illustrating a detailed structure of a drawing inspection displaying unit according to an embodiment of the present invention.

FIG. 11 is a view illustrating a configuration of a system inspection displaying unit according to an embodiment of the present invention.

FIG. 12 is a view illustrating an indoor unit type displaying unit for changing an indoor unit on the basis of a result of a system inspection according to an embodiment of the present invention.

FIG. 13 is a view when an indoor unit changed through the indoor type displaying unit of FIG. 12 is applied on a drawing displaying unit.

FIG. 14 is a view illustrating a configuration of a duct check displaying unit according to an embodiment of the present invention.

FIG. 15 is a view illustrating the display contents of a drawing displaying unit on the basis of an analysis result of a duct system according to an embodiment of the present invention.

FIG. 16 is a view illustrating an indoor unit type displaying unit to confirm attribute information on a duct system according to an embodiment of the present invention.

FIG. 17 is a block diagram illustrating a configuration of an installation guide system according to an embodiment of the present invention.

FIG. 18 is a flowchart illustrating a method of using an installation guide system for air conditioner according to an embodiment of the present invention.

BEST MODE FOR CARRYING OUT THE INVENTION

Figure 1:
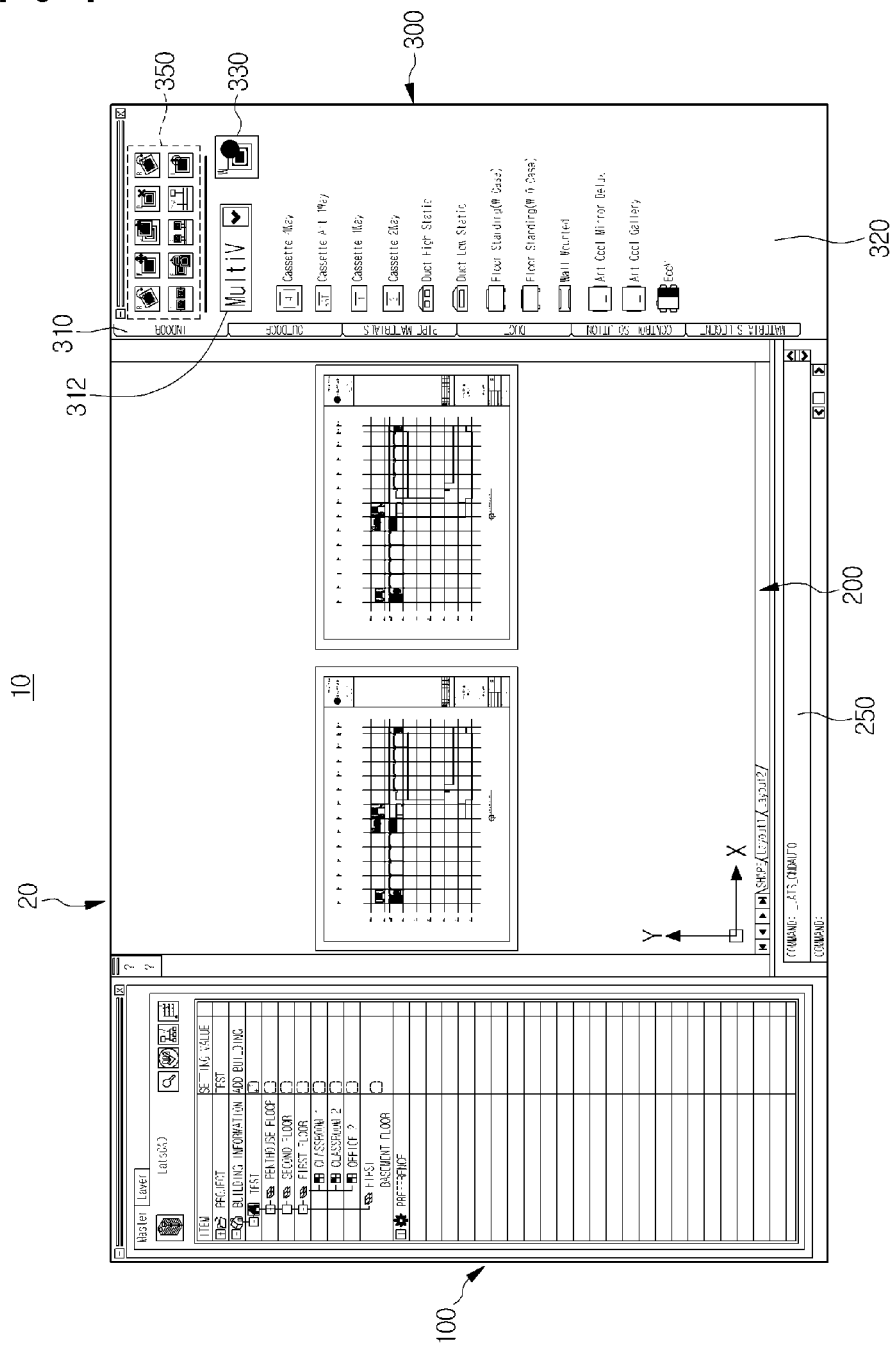
FIG. 1 is a view illustrating a configuration of an installation guide system according to an embodiment of the present invention.

Reference will now be made in detail to the embodiments of the present disclosure, examples of which are illustrated in the accompanying drawings.

Hereinafter, with reference to the drawings, specific embodiments of the present invention are described. However, the scope of the present invention is not limited to the suggested embodiments, and those skilled in the art may easily suggest other embodiments within the same scope of the idea.

FIG. 1 is a view illustrating a configuration of an installation guide system according to an embodiment of the present invention.

Referring to FIG. 1, the installation guide system 10 includes a display unit 20 for providing a guide for installation (for example, a layout-design) of an air conditioner to a user. The display unit 20 may be displayed when predetermined information (for example, a specific program) is executed, and may be understood as a user interface for outputting required information in response to a user's command input. Here, the specific program may be executed in a PC, a terminal, a server, or a control device.

The display unit 20 includes an installation information displaying unit 100 for displaying project (for example, an installation process) information for installing an air conditioner, information (for example, building information) on an installation space where an air conditioner is installed, and preference information for configuring a system. In more detail, the installation information displaying unit 100 displays a project, building information, and a configuration as an "item", and a configuration value for each "item" at the one side of the "item". The installation information displaying unit 100 may be arranged in one partitioned area of the entire area of the display unit 20.

The display unit 20 includes a drawing displaying unit 200 for displaying information on a space having an air conditioner installed (for example, floor information or room information of a building), or arrangement information on detailed devices (or apparatuses) of an air conditioner to be installed at the building. As one example, the room information may be information on partitioned rooms at each floor of a building.

A drawing relating to a structure of a building may be displayed on the drawing displaying unit 200, and installation information on an air conditioner may be displayed on the drawing. The drawing displaying unit 200 may be displayed on another partitioned area of the entire area of the display unit 20.

A command displaying unit 250 for inputting a predetermined command relating to an air conditioner into the drawing relating to the structure of the building may be displayed on one side of the drawing displaying unit 200. The command displaying unit 250 may display characters or symbols that are inputted during a corresponding step when a user manipulates a system and a user may select displayed characters or symbols or may input new characters or symbols in order to execute a predetermined command.

The display unit 20 may include a product information displaying unit 300 for displaying information on a detailed configuration (or an apparatus) of an air conditioner to be arranged on each floor or in each room of a building. The product information displaying unit 300 may be displayed on another partitioned area of the entire area of the display unit 20.

As one example, the display unit 20 is divided into three areas and each area displays the installation information displaying unit 100, the drawing displaying unit 200, or the product information displaying unit 300. The installation information displaying unit 100 and the product information displaying unit 300 may be combined and named as a "guide display unit" in that they display various menus for arranging an air conditioner on the drawing displaying unit 200.

The product information displaying unit 300 includes a product selecting unit 310 for displaying a detailed configuration of the air conditioner. As one example, the detailed configuration of the air conditioner includes indoor units, outdoor units, pipe materials, ducts, control solutions, and materials legends.

The product information displaying unit 300 includes a list displaying unit 320 for displaying a list on a detailed configuration of the air conditioner. As one example, when an indoor unit is selected as a detailed configuration of the air conditioner, the list displaying unit 320 displays a plurality of lists according to a type of the indoor unit.

The product information displaying unit 300 may further include an edit toolbar displaying unit 350 for displaying tools for arrange, modify, or add/delete functions in icons.

FIG. 2 is a view illustrating a configuration of an installation information displaying unit according to an embodiment of the present invention. FIG. 3 is a view illustrating a drawing displaying unit for configuring a room area according to an embodiment of the present invention.

Referring to FIG. 2, the installation information displaying unit 100 displays information (hereinafter, building information) on a building having an air conditioner installed. In the process of installing an air conditioner in a building, the installation information displaying unit 100 may be updated. FIG. 2 is a view illustrating a configuration of the installation information displaying unit 100.

The installation information displaying unit 100 includes an item displaying unit 110 for displaying items of installation information and a configuration value displaying unit 120 for displaying a configuration value of each item. In more detail, the item displaying unit 110 includes a building displaying unit 111 for displaying information on a building (for example, the name of a building), a floor displaying unit 112 for displaying information on each floor (for example, the name of a floor), and a room displaying unit 113 for displaying information on each room on a floor (for example, the name of a room).

As shown in FIG. 2, if looking at building information generated by the item displaying unit 110, the name of a building is "sae dong" and the building includes two floors above the ground and one underground floor. The first floor includes an office 2, a classroom 1, and a classroom 2.

The configuration value displaying unit 120 includes a building addition selecting unit 122 for adding a building (or a complex) to which an air conditioner is to be installed. The building addition selecting unit 122 may display selectable information such as "building addition"

When one of room names displayed on the item displaying unit 110 is selected, an information management displaying unit is displayed.

The information management displaying unit includes a "room basic information", "load information", "indoor unit capacity", and "ventilation information". The room basic information includes a floor name, a room name, a room CAD area, and room area information. If there is a difference between the room CAD area and the room area information, both areas may be adjusted to be identical to each other. When the room area designation is made (refer to FIG. 3), the room CAD area and the room area information may be generated or updated.

The load information includes a unit load relating to a cooling and heating load and actual load information. As mentioned above, the unit load may be configured in advance or newly inputted. The actual load information may be determined by the value obtained by multiplying room area information, generated or updated in a room area designation process, and a unit load. Additionally, the indoor room capacity and ventilation information may be generated or updated by an arrangement process of an indoor unit and a ventilation device.

Furthermore, the floor information displayed on the installation information displaying unit 100 and the structure drawing displayed on the drawing displaying unit 220 may be matched to each other by selecting the floor displaying unit 112.

In detail, when the floor displaying unit 112 is selected, a plurality of detailed menus are displayed. When a "floor area designation" menu is selected from the plurality of detailed menus and an area of a corresponding floor is configured on the drawing displaying unit 200, an area is matched so that it is determined that the corresponding floor corresponds to which portion on the drawing. A method of configuring an area of a corresponding floor in the drawing displaying unit 200 includes a method of dragging and configuring a computer mouse. Also, the reference point of each floor may be configured by selecting a "floor reference point configuration" menu from the plurality of detailed menus.

Furthermore, room information displayed on the installation information displaying unit 100 and a structure drawing displayed on the drawing displaying unit 200 are matched to each other by selecting the room displaying unit 113.

In detail, when the room displaying unit 113 is selected, a plurality of detailed menus are displayed. When a "room area creation" menu is selected, from the plurality of detailed menus and an area of a corresponding room is configured on the drawing displaying unit 200, an area is matched so that it is determined that the corresponding room corresponds to which portion on the drawing.

As one example, as shown in FIG. 3, the drawing displaying unit 200 includes a first floor drawing 201 for displaying a structure of the first floor. The first floor drawing 201 includes the first room 202, which is understood as one example of a plurality of rooms. When the boundary area of the first room 202 (for example, an outer boundary line) is configured, the room area displaying unit 203 may be designated. A method of configuring an area may be identical to that of configuring a floor area.

As mentioned above, when matching between information on the installation information displaying unit 100 and information on the drawing displaying unit 200 is made after floor area and room area designations are completed, as shown in FIG. 5a, a configuration value displaying unit 120 displays a predetermined symbol (as one example, "R") for displaying that designation (i.e. matching) between building information and a drawing is completed. That is, a matching completion display includes "F" as a floor configuration value and "R" as a room configuration value.

After the matching is completed, as one floor is selected from a plurality of floors displayed on the floor displaying unit 112, information on a plurality of rooms in the selected floor is displayed. At this point, the displayed information on the plurality of rooms may be pop-up and may be displayed on the drawing displaying unit 200.

Moreover, while a room area designation is made through the drawing displaying unit 200, if the one floor is selected, the displayed information on the plurality of rooms includes the area and load information of each room.

FIG. 4 is a view illustrating a configuration of an indoor type displaying unit according to an embodiment of the present invention.

Referring to FIGS. 1 and 4, a process of selecting a desired type of an indoor unit and arranging it on the drawing displaying unit 200 will be described.

Referring to FIG. 1, a product information displaying unit 300 includes a product selecting unit 310 for selecting one of a plurality of products constituting an air conditioner such as indoor units, outdoor units, pipe materials, ducts, control solutions, and materials legends.

Also, the product information displaying unit 300 includes a category selecting unit 312 for selecting a category of the product selected by the product selecting unit 310. Here, the category may be understood as a category of an air conditioner. As one example, when an indoor unit is selected by the product selecting unit 310, the category selecting unit 312 may include "Single", "Multi/Single A", and "Multi V" types, as selectable menu.

The product information displaying unit 310 includes a list displaying unit 320 for displaying types of related indoor units on the basis of the information selected by the product selecting unit 310 and the category selecting unit 312.

The product information displaying unit 300 includes an executable automatic arrangement selecting unit 330 for automatically arranging indoor units on the drawing displaying unit 200 if the indoor units are selected as products to be installed. The automatic arrangement selecting unit 330 may be activated only when an "indoor unit" is selected by the product selecting unit 310.

When at least one indoor unit is selected by the list displaying unit 210, as shown in FIG. 4, the display unit 20 displays an indoor unit type displaying unit 340.

The indoor unit type displaying unit 340 includes a type displaying unit 341 for displaying a type of an indoor unit selected by the list displaying unit 320, a model displaying unit 342 for displaying the indoor unit model corresponding to the indoor unit type, and a shape displaying unit 344 for displaying the shape of an indoor unit to be selected.

The type displaying unit 341 may include a plurality of selectable types, and changing into or selecting different types may be possible. When one of a plurality of types in the type displaying unit 341 is selected, at least one model name corresponding to the selected type is displayed on the model displaying unit 342. Moreover, the shape displaying unit 344 displays the shape of the selected model, that is, one model of the plurality of models.

The product information displaying unit 340 includes a product selecting unit 200 for displaying a detailed configuration of the air conditioner. That is, the indoor unit information displaying unit 343 may display information corresponding to an indoor unit of the model selected by the model displaying unit 342. As one example, the information may include the model, name, cooling and heating capacity, and cooling and heating load of an indoor unit.

After the type and model of an indoor unit are selected, as a "confirm" button is inputted, an indoor unit to be arranged may be determined.

When one model for an indoor unit is selected through the indoor unit type displaying unit 340, an indoor unit of the selected model may be arranged on the drawing displaying unit 200. In more detail, a user selects one point of the drawing displaying unit 200 in order to recognize it as an indoor unit arrangement point. As one example, one point where an indoor unit is to be arranged may be selected using a computer mouse. Once the indoor unit arrangement point 243 is recognized, an indoor unit determined in FIG. 4 is inserted into the drawing displaying unit 200.

FIG. 5 is a view illustrating a configuration of an indoor unit automatic arrangement displaying unit according to an embodiment of the present invention.

When the automatic arrangement selecting unit 330 of the product information displaying unit 300 is selected, the command displaying unit 250 displays a message "select the boundary for automatic arrangement of an indoor unit".

A user may select a room (space) area where an indoor unit is to be arranged among at least one room listed in the drawing displaying unit 200, on the basis of such a message. As mentioned above, a room area displaying unit 203 may be generated by designating the outer area of a room with a mouse.

Then, when the automatic arrangement selecting unit 330 is selected again, as shown in FIG. 5, the display unit 20 displays an indoor unit automatic arrangement displaying unit 360. The indoor unit automatic arrangement displaying unit 360 includes a model displaying unit 361 for selecting the type and model of a desired indoor unit for arrangement, and an arrangement information displaying unit 362 for displaying arrangement information on the indoor unit of the selected model.

The arrangement information displaying unit 362 includes an arrangement division displaying unit 363 for selecting whether an indoor unit is arranged at the center or wall of a room, a room information displaying unit 364 for displaying information on a room where an indoor is to be arranged, and an arrangement configuration displaying unit 365 for displaying information on an arrangement interval of an indoor unit.

The arrangement division displaying unit 363 may include a plurality of selectable arrangement divisions. The plurality of arrangement divisions include "central arrangement" in which the selected indoor unit is arranged based on the center of a corresponding room, "wall arrangement" in which the selected indoor unit is arranged based on the four-directions wall, and "user designation arrangement" in which a user sets up the arrangement reference point of an indoor unit.

The room information displaying unit 364 may display the area of a room, load information (actual load), and information on the capacity of an indoor unit. In more detail, when one model for an indoor unit is selected through the model displaying unit 361, capacity information on the selected model (an indoor unit), area information on a room, and load information are displayed.

Also, based on such information, it is recommended for optimization that how many selected indoor units be installed at a corresponding room. That is, the room information displaying unit 364 may display "the recommended number" of selected indoor units. Accordingly, according to the capacity of an indoor unit, a room area, and load information, a user does not need to worry about how many indoor units are arranged and how to arrange indoor units. Therefore, easy-of-use may be enhanced.

The quantity input unit 364a of the room information displaying unit 364 may receive information 364a on the matrix of indoor units to be arranged, that is, information on the number of rows W and the number of columns C. A user may input information on the matrix on the basis of the recommended number. As mentioned above, the W*C value is understood as the number of indoor units to be arranged.

Also, the arrangement configuration displaying unit 365 may display information on how to arrange the indoor units of the inputted number W*C, that is, arrangement information. The arrangement information includes information on an interval (hereinafter, referred to as a row interval) between one indoor unit and another indoor unit that constitute a row and an interval (hereinafter, referred to as a column interval) between one indoor unit and another indoor unit that constitute a column, in relation to the information on the matrix, and an angle (hereinafter, referred to as an arrangement angle) that the matrix of an indoor unit makes with respect to the wall of a room.

Thus, according to the indoor unit automatic arrangement system, once the type and model of an indoor to be arranged are selected, since the indoor unit is automatically arranged in the designated room, a user does not need to arrange indoor units one by one on the drawing displaying unit 200.

Figure 6:
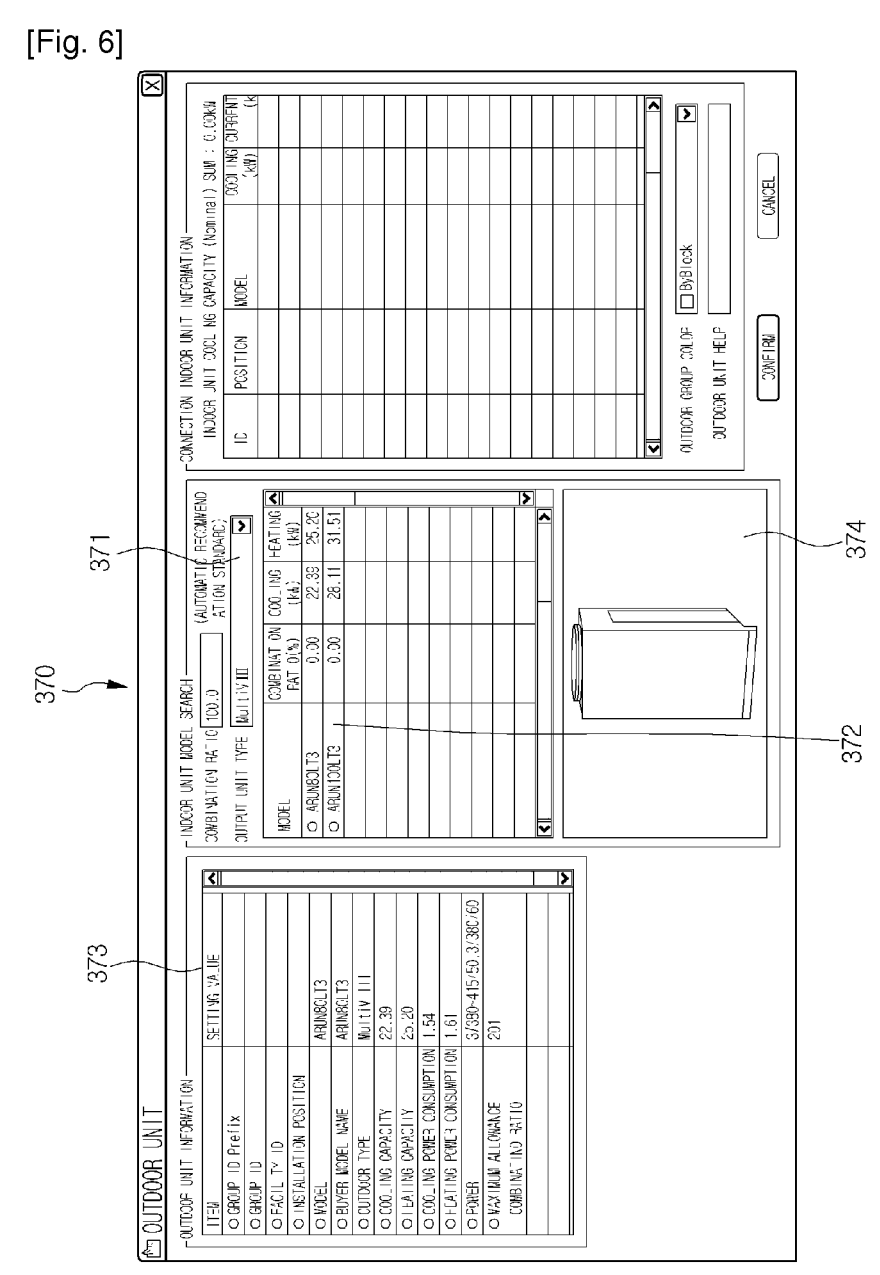

FIG. 6 is a view illustrating a configuration of an outdoor unit type displaying unit according to an embodiment of the present invention.

When an outdoor unit is selected by the product selecting unit 310, the product information displaying unit 300 displays a category selecting unit 132 for displaying a category of an air conditioner and a list displaying unit 320 for displaying types of an output door unit. Then, when one is selected from at least one outdoor unit displayed on the list displaying unit 210, as shown in FIG. 6, the display unit 20 displays an outdoor unit type displaying unit 370.

The outdoor unit type displaying unit 370 includes a type selecting unit 371 for selecting the type of an outdoor unit, a model displaying unit 372 for displaying the model of a selected output door type, an outdoor unit information displaying unit 373 for displaying information relating to an outdoor unit of a model selected by the model displaying unit 372, and a shape displaying unit 374 for displaying the shape of the selected model.

The outdoor unit information displaying unit 373 may display information relating to an outdoor unit selected by the model displaying unit 372. As one example, the information related to the outdoor unit may include an outdoor unit model, an outdoor unit type, cooling and heating capacity, cooling and heating power consumption, the maximum allowable combination ratio, and a total pipe length. Here, the combination ratio is understood as a ratio of an indoor unit capacity to an outdoor unit capacity.

Also, the outdoor unit type displaying unit 370 may display information on an indoor unit connected to a selected outdoor unit. The connection indoor unit information may be generated or updated during an installation guide process of an air conditioner.

After the type and model of an outdoor unit are selected, as a "confirm" button is inputted, an outdoor unit to be arranged may be determined.

Moreover, the product selecting unit 310 includes "pipe materials" as a products type. When the pipe materials are selected, the list displaying unit 320 displays a list of materials relating to a pipe connecting an indoor unit with an outdoor unit.

The list displaying unit 320 includes "riser hole". The "riser hole" may be understood as a pipe material connecting a floor with another floor. When the "riser hole" is selected, a riser hole arrangement displaying unit (not shown) may be displayed.

The riser hole arrangement displaying unit includes riser hole/down hole information. The riser hole/down hole information includes a "riser hole division displaying unit" for selecting a refrigerant pipe and a drain pipe as the type of a pipe, and a "top floor displaying unit" and a "bottom floor displaying unit" for selecting top floor and bottom floor information. After information for the riser hole/down hole is inputted and a confirm button is pressed, riser hole information is configured.

Also, a user may select one point of a structure drawing, which represents a specific floor on the drawing displaying unit 200, as a reference point. Once the reference point is selected, the riser hole may be arranged at the same position by each floor on the basis of the configured riser hole information.

FIG. 7 is a view illustrating a drawing displaying unit when a main pipe is wired according to an embodiment of the present invention.

As described above, when an indoor unit and an outdoor unit are arranged, the main pipe may be configured as a refrigerant pipe connecting an indoor unit with an outdoor unit. First, when a wiring tool 358 (refer to FIG. 8) in the edit toolbar displaying unit 350 is selected, the drawing displaying unit 200 switches into a pipe drawing (wiring) available state.

In more detail, referring to FIG. 7, an indoor unit 265 and an output door unit arrangement point 261 are displayed on the drawing displaying unit 200. A user may configure the main pipe line 262 from the outdoor unit arrangement point 261 or a riser hole reference point (not shown) toward an area where the indoor unit 265 is arranged. As one example, by drawing a bending line with a mouse, the main pipe line 262 may be displayed.

Also, the command displaying unit 250 displays a message for selecting smart wiring S. A user selects the smart wiring, for example, inputs "S" on the command displaying unit 250, in order to input a smart wiring command.

After the smart wiring command is inputted, the main pipe line 262 displayed on the drawing displaying unit 200 is selected and an indoor unit arrangement area is designated. The indoor arrangement area is understood as an area including indoor units 265 to which the main pipe is to be connected. When the indoor unit arrangement area is designated, a branched part is automatically arranged at the point where the branched pipe 266 is branched from the main pipe line 262.

Thus, when the main pipe line is configured after an indoor unit and an output door unit are selected, an arrangement structure in which an indoor unit is connected from the main pipe line may be automatically formed. Therefore, easy of use is excellent.

However, unlike the above description, when the smart wiring command is not inputted, by directly selecting the branched pipe of the list displaying unit 320, the branched pipe may be inserted into the drawing displaying unit 200.

FIG. 8 is a view illustrating a configuration of an edit toolbar displaying unit according to an embodiment of the present invention.

Referring to FIG. 8, the edit toolbar displaying unit 350 includes a rotate tool 351. The rotate tool 351 allows an object, for example, the detailed products or apparatuses (materials) constituting an air conditioner, to rotate in a specific direction when the object is arranged on the drawing displaying unit 200. An icon representing the rotate tool 351 and the object are sequentially selected and a rotation direction or rotation value is inputted, so that the object may rotate in a desired direction.

The edit toolbar displaying unit 350 includes a move tool 352. The move tool 352 moves the object from the reference point to the selection point. An icon representing the move tool 352 and the object are sequentially selected and the reference point and the movement point are selected (or inputted), so that the object may move. At this point, when the object is connected to another object, it remains connected as the object moves.

The edit toolbar displaying unit 350 includes a copy tool 353. The copy tool 353 may be selected when a specific object is to be copied. As one example, when a plurality of objects are inserted into the drawing displaying unit 200, the copy tool 353 may be used.

The edit toolbar displaying unit 350 includes a delete tool 354. The delete tool 354 deletes the object. An object may be deleted by sequentially selecting an icon representing the delete tool 354 and the object, i.e. a target to be deleted.

The edit toolbar displaying unit 350 includes a reverse rotate tool 355. The reverse rotate tool 355 rotates an object in a 180° direction. An object may rotate at 180° by sequentially selecting an icon representing the reverse rotate tool 355 and the object, i.e. a target to be rotated.

The edit toolbar displaying unit 350 includes an align tool 356. The align tool 356 is used to align objects in a vertical or parallel direction. Objects may be aligned in a designated direction by sequentially selecting an icon representing the align tool 356 and the objects, i.e. targets to be aligned, and designating an alignment direction (a vertical or parallel direction). Then, as a selectable alignment option, object uniform arrangement may be included in a submenu of the align tool 356.

The edit toolbar displaying unit 350 includes a match tool 357. The match tool 357 is used to match object attribute information. When an icon representing the match tool 357 and a plurality of objects, i.e. matching targets to icons, are sequentially selected, an attribute of a first selected device may be reflected (matched) on a second selected device.

The edit toolbar displaying unit 350 includes a wiring tool 358. The wiring tool 358 may be used to perform wiring on a refrigerant pipe or a drain pipe on the basis of a port of an object (for example, an indoor unit or an outdoor unit). After an icon representing the wiring tool 357 is selected, an object or a port is designated, so that wiring may be performed manually, or a wiring option (for example, smart wiring, and parallel path wiring) may be selected.

The edit toolbar displaying unit 350 includes an annotation tool 359a. The annotation tool 359a is used to generate an annotation on an object. After an icon representing the annotation tool 359a is selected and a pipe or riser hole is selected for annotation, its position and path may be designated.

The edit toolbar displaying unit 350 includes an attribute tool 359b. The attribute tool 359a is used to confirm attribute information on an object. After an icon representing the attribute tool 359a is selected, an object, i.e. a target for attribute information, may be selected for execution.

As one example, when the attribute tool 359a is selected and an indoor unit or an outdoor unit in the drawing displaying unit 200 is selected, the indoor unit type displaying unit or the outdoor unit type displaying unit 370 shown in FIG. 4 or 6 is displayed. At this point, information displayed on the indoor unit type displaying unit 340 or the outdoor type displaying unit 370 may be changed.

FIG. 9 is a view illustrating a configuration of a control toolbar displaying unit according to an embodiment of the present invention. FIG. 10 is a view illustrating a configuration of a drawing inspection displaying unit according to an embodiment of the present invention.

Referring to FIGS. 9 and 10, the installation information displaying unit 100 includes a selectable control toolbar displaying unit 150 for performing a system inspection.

In more detail, the control toolbar displaying unit 150 includes a refresh selecting unit 151 for updating installation information on an air conditioner, for example, connection information on detailed product or apparatus (device). When the refresh selecting unit 151 is selected, the drawing on a building structure may be matched (synchronized) to the installation information on an air conditioner configured through the system 10.

The control toolbar displaying unit 150 includes a drawing inspection selecting unit 152 for displaying drawing information realized in the system 10, for example, a connection structure of an indoor unit and an outdoor unit, and inspecting whether there is any error.

When the drawing inspection selecting unit 152 is selected, as shown in FIG. 10, the display unit 20 displays a drawing inspection displaying unit 380.

The drawing inspection displaying unit 380 includes an option selecting unit 38 for selecting the type of a structure (tree) to be displayed, a drawing configuration information displaying unit 382 for displaying information on the structure selected by the option selecting unit 381 and an error information displaying unit 383 for displaying whether there is any, error on a connection configuration of a corresponding structure.

In the option selecting unit 381, selectable "detailed structure", "position search", and "trace" buttons are included as one group (a first group), and "refrigerant structure", "drain structure", and "control" buttons are included as another group (a second group). The first group is understood as a group relating to an inspection type and the second group is understood as a group relating to the type of a drawing structure.

Also, the option selecting unit 381 may further include a selectable input unit called "tree configuration". The "tree reconfiguration" is understood as an input unit, i.e. a "refresh" input unit, to configure a tree by reflecting the latest information relating to a connection structure of an air conditioner.

When a detailed structure is selected by the option selecting unit 381, one of the refrigerant structure, the drain structure, and the control button is selected, and then, a tree reconfiguration is inputted, a detailed structure corresponding to each structure is displayed on the drawing configuration information displaying unit 382. In FIG. 10, as one example, a detailed structure for a refrigerant structure is displayed. The detailed structure includes a refrigerant-flow based structure from an outdoor unit to a riser hole and an indoor unit, i.e. a refrigerant structure tree 382a.

If there is an error in the refrigerant structure, (as one example, the main pipe described in FIG. 9 may not be properly formed, or a part of the main pipe is disconnected), the error information displaying unit 383 displays a message for "one connection configuration error occurs and check the list". Also, a tree of the corresponding apparatus (for example, an indoor unit) that generates an error may be displayed with a specific color or may be displayed to blink in order to make error checking easy.

A user may check "position search" in the option selecting unit 381 and then may input "tree reconfiguration" in order to confirm the drawing position of an error occurring apparatus. In this case, an area where the apparatus is positioned is enlarged and displayed on the drawing displaying unit 200.

Although not shown in the drawings, when the "detailed structure" and "drain structure" are selected from the option selecting unit 381, the drawing configuration information displaying unit 382 may display a path structure on drainage flow, that is, a drainage structure tree. As one example, the drainage structure tree is a tree structure in which a drain exit and a riser hole are connected to an indoor unit via a connection port in the reverse order of a draining path.

Another embodiment is suggested.

In the above embodiment, it is characterized that the drawing inspection selecting unit 152 is selected, and then, the "drainage structure" is selected from the drawing inspection displaying unit 380 in order to display a drainage structure tree. However, unlike this, a drain pipe check selecting unit 154 may be selected from the control toolbar displaying unit 150 in order to immediately display the drainage structure tree.

When the "detailed structure" and "control structure" are selected from the option selecting unit 381, the drawing configuration information displaying unit 382 may display a control structure tree including a structure relating to a control line connected between a central control unit, an outdoor unit, and an indoor unit. The structure relating to the control line includes a connected cable length from the central control unit to the outdoor unit, a connected cable length between the indoor/outdoor units, or information on connection between the central control unit and the indoor/outdoor units.

Another embodiment is suggested.

In the above embodiment, it is characterized that the drawing inspection selecting unit 152 is selected, and then, the "control e structure" is selected from the drawing inspection displaying unit 380 in order to display a control structure tree. However, unlike this, the control check selecting unit 155 may be selected from the control toolbar displaying unit 150 in order to immediately display the control structure tree.

Furthermore, the control toolbar displaying unit 150 further includes a selectable drain pipe check selecting unit 154 for confirming a drain pipe connection structure. When the drain pipe check selecting unit 154 is selected, a drain structure of the drawing inspection displaying unit 380 may be activated. Also, the diameter of a drain pipe is automatically configured, so that it may be annotated on the drawing displaying unit 200.

Furthermore, the control toolbar displaying unit 150 further includes a selectable control check selecting unit 155 for confirming a control line of an air conditioner. When the control check selecting unit 155 is selected, a control button of the drawing inspection displaying unit 380 may be activated. The drawing inspection displaying unit 380 displays a cable length on the basis of the central control line of an air conditioner and also quantity information on indoor units connected to a controller.

The control toolbar displaying unit 150 further includes a selectable duct check selecting unit 156 for selecting the diameter of a duct and a subsidiary model and calculating pressure loss values. Also, the drawing relating to the arrangement of a duct may be automatically inserted into the drawing displaying unit 200.

FIG. 11 is a view illustrating a configuration of a system inspection displaying unit according to an embodiment of the present invention. FIG. 12 is a view illustrating an indoor unit type displaying unit to change an indoor unit on the basis of the result of a system inspection. FIG. 13 is a view when an indoor unit changed through the indoor unit type displaying unit of FIG. 18 is applied on a drawing displaying unit.

Referring to FIGS. 9 and 11, the control toolbar displaying unit 150 includes a selectable effectiveness inspection selecting unit 153 for confirming a system verification result value for each apparatus. The effectiveness inspection may be understood as an inspection for confirming whether each apparatus constituting an air conditioner is properly arranged through an installation simulation of the air conditioner on the basis of the design information on the air conditioner, that is, whether a capacity of an apparatus is designed in correspondence to building information.

When the effectiveness inspection selecting unit 153 is selected, as shown in FIG. 11, the display unit 20 displays a system inspection displaying unit 390.

The system inspection displaying unit 390 includes an inspection item displaying unit 391 for displaying an, outdoor unit based apparatus list, a verification mode selecting unit 392 for selecting a verification required system mode (cooling or heating), a combination range configuring unit 393 for configuring a combination ratio range of an indoor unit and an outdoor unit, and a verification result displaying unit 394 for displaying a verification result of a system. Here, the combination ratio range is a ratio of an indoor capacity to an outdoor capacity, and the range of the maximum value and the minimum value may be configured.

The system inspection displaying unit 390 may further include a plurality of selectable input units. The plurality of input units include a system analysis selecting unit 395 for requesting a system analysis, a report output selecting unit 396 for outputting design information on an air conditioner in a report form, and an apparatus table selecting unit 397 for outputting information on apparatuses and pipes applied to a design drawing in a table form.

The inspection item displaying unit 391 may further include the group ID, installation position, combination ratio, and cooling and heating capacity of an outdoor unit. Also, the inspection item displaying unit 391 includes a check box for displaying a plurality of outdoor units applied to a design drawing, and selecting at least one outdoor unit for system analysis After at least one outdoor unit is selected through the check box, when the system analysis selecting unit 395 is selected, an analysis time (a check time) at which an analysis is performed and also a display representing whether an analysis is completed are sequentially displayed depending on the time elapsed. This display is displayed on the inspection item displaying unit 391 as an item such as PiPe (being analyzed) and Syst. (analysis completed).

Also, a capacity verification result may be further displayed on the verification result displaying unit 394. The verification result contents include information relating to a pipe length and information relating to a height difference between an outdoor unit and an indoor unit.

As one example, the verification result contents may include "a total pipe length", "the longest pipe length (equivalent length)" "the longest pipe length after the first branched pipe", "a height difference (above an outdoor unit), "a height difference (below an indoor unit)", "a height difference (between indoor units)", and "the longest pipe length (mounting)".

Also, the limit and current value relating to the contents of the verification result information are displayed on the verification result displaying unit 394. That is, the limit and current value are displayed to be compared.

If the current value is within the limit value and the combination ratio and the cooling and heating capacity are within a configuration range, an air conditioner is understood as being successfully installed. In this case, for example, without an error message, a message "system inspection is successfully completed" is displayed on the verification result displaying unit 394.

On the other hand, if the current value is out of the limit value, or the combination ratio is out of the range of the combination range configuring unit 393, or the cooling and heating capacity is less than an actual load, a message for representing that an error occurs in design information of an air conditioner may be outputted. Here, the actual load is a determined value on the basis of the area of a room where an air conditioner is to be installed and sensible heat generation.

As one example, when the combination ratio is out of the range that the combination range configuring unit 393 configures, an error message "a combination ratio is out of a configuration range" may be displayed. Also, if the cooling and heating capacity of the indoor unit are less than the actual load, a message "cooling load of (specific) room at (specific) floor: indoor unit capacity (6.00 KW)<actual load (10.78 KW) is less than the reference value" may be outputted. Also, a list of the corresponding apparatus that generates an error may be displayed with a specific color or may be displayed to blink in order to make error checking easy.

When a user selects an error occurring indoor unit and an "attribute information" input unit of the system inspection displaying unit 290, as shown in FIG. 12, the attribute information on the indoor unit may be confirmed.

In detail, the indoor unit type displaying unit 340 is displayed on the display unit 20. The indoor unit type displaying unit 340 includes a type displaying unit 341 and a model displaying unit 342 for displaying the type and model of a selected indoor unit, an indoor unit information displaying unit 343 for displaying the connection information and capacity information on the selected indoor unit, and a shape displaying unit 344 for displaying the shape of an indoor unit. At this point, indoor unit items displayed on the model displaying unit 342 may be indoor units whose errors shown in the system inspection displaying unit 290 may be resolved.

According to an analysis result of the system inspection displaying unit 390, an indoor unit having errors may be replaced with one indoor unit in a list of a plurality of indoor units in the model displaying unit 342. When a user selects one indoor unit in the model displaying unit and selects a "confirm" button, the indoor unit having errors changes into the selected indoor unit.

Also, as shown in FIG. 13, the changed indoor unit is inserted into the drawing displaying unit 200. In detail, the system inspection displaying unit 390 displays the indoor unit 265*a* before a change on the drawing displaying unit 200 at the timing of when the system analysis is performed. Also, when a command on changing into another indoor unit is inputted into the indoor unit type displaying unit 340, an indoor unit 265*b* after a change is displayed on the drawing displaying unit 200.

FIG. 14 is a view illustrating a configuration of a duct check displaying unit according to an embodiment of the present invention. FIG. 15 is a view illustrating the display contents of a drawing displaying unit depending on an analysis result of a duct system according to an embodiment of the present invention. FIG. 16 is a view of an indoor unit type displaying unit to confirm attribute information on a duct system according to an embodiment of the present invention.

When the duct check selecting unit 156 is selected from the control toolbar displaying unit 150 shown in FIG. 9, as shown in FIG. 14, the display unit 20 displays a duct check displaying unit 450.

The duct check displaying unit 450 includes an item displaying unit 451 for displaying a list on ducts and ventilation apparatuses, a verification result displaying unit 452 for displaying a capacity verification result on the apparatuses displayed on the item displaying unit 451, and a plurality of input units.

The item displaying unit 451 displays the name, model, installation position, and ventilation capacity of each apparatus. Also, the verification result displaying unit 452 displays information on whether a specific capacity value satisfies a range of a reference value or whether errors occur after the apparatus' capacity verification. As one example, the verification result displaying unit 452 may output a message such as "The pipe diameter (75) of a terminal device is too small and thus the diameter (100) of a pipe cannot be connected. The first pipe of a SDUYB150ZA model cannot be connected. The external static press loss value (127.07) satisfies the reference value (150.00).

Also, the item displaying unit 451 may display a specific color or blinking at the position corresponding to an apparatus having errors.

The plurality of input units include a system analysis selecting unit 453 for apparatus's system analysis, attribute information selecting unit 454 for confirming attribute information on a selected apparatus, and a duct deletion selecting unit 455 for deleting a duct inserted into the drawing displaying unit 200. The message of the verification result displaying unit 452 may be displayed when one apparatus of the item displaying unit 451 is selected and then the system analysis selecting unit 453 is inputted.

Moreover, the drawing displaying unit 200 includes an apparatus displaying unit 280 for enlarging and displaying the position where an apparatus having errors is inserted in the verification result displayed on the verification result displaying unit 452. The apparatus displaying unit 280 may display that corresponding errors are resolved and displayed.

As one example, as shown in the verification result displaying unit 452, if the message is "The first pipe of a SDUYB150ZA model cannot be connected", it means that there is an error in the pipe connection. Thus, a corresponding pipe is automatically drawn and (wired) for connection and is displayed on the apparatus displaying unit 280. A user may confirm that error information is resolved, by selecting the apparatus displaying unit 280, for example, by clicking with a mouse.

Moreover, when one apparatus (an indoor unit) displayed on the item displaying unit 451 is selected and the attribute information selecting unit 454 is inputted, as shown in FIG. 16, the display unit 20 displays the indoor unit type displaying unit 340. The indoor unit type displaying unit 340 includes a model displaying unit 342, an indoor unit information displaying unit 343, and a shape displaying unit 344, in relation to the indoor unit information. Also, the indoor unit type displaying unit 340 includes a connection device item displaying unit 348 for displaying items about connection device information on the indoor unit. A user selects one of a plurality of models in the model displaying unit 342 and selects one of a plurality of models in the connection device item displaying unit 348 in order to change an indoor unit and a connection device.

While system inspection is successfully completed, if the report output selecting unit 396 is selected, the display unit 20 displays a report item displaying unit (not shown). The report item displaying unit includes an output item selecting unit for selecting items that are included in a report to be outputted and a user may check desired items and then may press a confirm button.

Once the confirm button is inputted, a report (not shown) is displayed. The report includes installation information on an air conditioner. The installation information on the air conditioner includes information on an indoor unit, an outdoor unit, and a ventilation unit, for example, information on the type, quantity, cooling and heating capacity, power consumption, or access port size of each apparatus. Such a report may be delivered to a customer (such as building owners and architects).

FIG. 17 is a block diagram illustrating a configuration of an installation guide system according to an embodiment of the present invention. FIG. 18 is a flowchart illustrating a method of using an installation guide for air conditioner according to an embodiment of the present invention.

Referring to FIG. 17, the installation guide system 10 includes an input unit 21 for inputting a predetermined command for an arrangement design of an air conditioner, a memory unit 23 for storing drawing information on a space where an air conditioner is to be installed, a display unit 20 for displaying a process for an arrangement design of the air conditioner, and a control unit 25 for controlling their configurations.

The input unit 21 may be a keyboard or a mouse of a computer. However, if a user command is inputted to the installation guide system 10, any form of an input unit may be possible.

The memory unit 23 may store drawing information including at least one structure among information on a building where an air conditioner is to be installed, floor information, and room information. Such drawing information may be delivered from a customer (such as a building owner and architect) and may be stored in the system 10. Also, in the process of designing the arrangement of an air conditioner, such drawing information may be displayed on the display unit 20.

Referring to FIG. 18, a method of using the installation guide system 10 will be described according to an embodiment of the present invention.

By executing a specific program, the display unit 20 displays the program. Then, startup environment information (or driving condition information) is configured by using a menu displayed on the display unit 20. Here, a method of configuring the startup environment of the system includes a process for generating a process (project) for installing an air conditioner, generating space information, and designating an area where the air conditioner is to be installed in operation S11.

Once the startup environment is configured, a process for arranging a detailed apparatus of the air conditioner, that is, an indoor unit, an outdoor unit, and other pipes, is performed. First the indoor unit is arranged.

In more detail, an indoor unit is selected as the type of product displayed on the product information displaying unit 300, and then, the type and model of the indoor unit are selected.

The indoor unit of the selected model may be automatically arranged on the drawing displaying unit 200. At this point, by selecting the automatic arrangement selecting unit 330, the automatic arrangement command of the indoor unit may be inputted. Then, on the basis of the message outputted to the command displaying unit 250, a room boundary for automatically arranging the indoor unit may be selected.

Then, on the basis of the area and load information of the room where the indoor unit is to be installed, the installation number of indoor units may be recommended, and once a user confirmation input is made, according to the inputted information, the indoor unit may be automatically installed on the drawing displaying unit in operation S12.

Next, an outdoor unit may be arranged. In more detail, an outdoor unit is selected as the type of product displayed on the product information displaying unit 300, and then, the type and model of the outdoor unit are selected.

Then, the outdoor unit of the selected model may be arranged at one point on the drawing displaying unit 200. As one example, when one point of the drawing displaying unit 200 is clicked using a mouse, the outdoor unit of the selected model may be inserted into the drawing displaying unit 200.

Once the arrangements of the indoor unit and the outdoor unit are made, a riser hole insertion point connecting a floor and another floor may be designated. Then, by selecting the wiring tool 358 of the edit toolbar displaying unit 350, the main pipe connected from the riser hole insertion point to the indoor unit may be drawn. As one example, straight or bending lines may be displayed on the drawing displaying unit 200 by using a mouse.

Once the main pipe line 262 is inserted on the drawing displaying unit 200, by inputting "smart wiring" on the command displaying unit 250, a branched pipe or a header, which is to be connected from the main pipe line 262 to the indoor unit, may be automatically inserted. Here, the header may be understood as a component coupled to the branched pipe to guide the branching of a refrigerant in operation S13.

In such a manner, when an apparatus (an indoor unit, an outdoor unit, and a pipe) of an air conditioner is inserted, a system inspection may be made on whether an arrangement design of an air conditioner is made effectively.

First, drawing inspection is made on whether apparatuses and pipes inserted on the drawing displaying unit 200, that is, the crated drawing, are effectively connected. During the drawing inspection operation, in order to confirm whether a refrigerant pipe or a drain pipe is effectively arranged, the detailed structure of the drawing may be displayed. The detailed structure is a tree structure to easily confirm a connection relationship from an outdoor unit to a riser hole and an indoor unit in operation S14.

Also, that is, effectiveness inspection/verification may be made in order to confirm a verification result of a system for each apparatus, i.e. the effectiveness inspection of the system. During the effectiveness inspection operation, a list of apparatuses constituting an air conditioner is displayed on the basis of an outdoor unit, and by inputting a "system analysis" command, verification is made on whether the combination ratio and cooling and heating capacity of an outdoor unit and an indoor unit are appropriate.

That is, an inspection may be made on whether the combination ratio of an indoor unit and an outdoor unit is within a reference range or whether the cooling and heating capacity of an indoor unit and an outdoor unit corresponds to a reference capacity. Here, the indoor unit reference capacity may be determined based on actual information (area information and load information) on an indoor unit to be installed. Also, the reference capacity of an outdoor unit may be configuration information on the capacity of an outdoor unit to which at least one indoor unit is connected.

Also, verification may be made on whether information values relating to the lengths of pipes constituting an air conditioner or a height difference between outdoor units (indoor units) are within the limit value.

Also, once the drawing and system effectiveness inspections are completed, a report and an apparatus list including information on the verification result may be inputted in operation S15.

Thus, by using the installation system 10, a design relating to the apparatus selection and arrangement of an air conditioner may be easily made, so that the installation of an air conditioner is effectively provided.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

According to an embodiment, in relation to an installation guide system of an air conditioner, the installation environment of a building is stored from an actual drawing relating to the building, and according thereto, the selection or arrangement of an air conditioner proper for the stored installation environment can be made. Therefore, an air conditioner optimized for a building's environment can be installed, and also industrial applicability is considerable.

The invention claimed is:

1. An installation guide system for an air conditioner, the system comprising:
a memory that stores drawing information on a building where the air conditioner is to be installed;
a display that provides a user interface to design an arrangement of the air conditioner, the display including:
an installation information display arranged in a first area of the display and configured to display installation process information for installing the air conditioner and the information on an installation space where the air conditioner is to be installed;
a product information display arranged in a second area of the display and configured to display information on a configuration of an outdoor device, an indoor device, and pipe materials, to be arranged on a floor or in a room provided in the building;
a drawing display arranged in a third area of the display and configured to display an arrangement for the outdoor device, the indoor device, and the pipe materials constituting the air conditioner on the building drawing information, which includes information on the floor or the room, the third area being disposed between the first area and the second area;
an effectiveness inspection selector that performs a verification on a capacity of an apparatus constituting the air conditioner based on design information on the air conditioner; and
a system inspection display including a verification result display to display a verification result on whether the capacity of the apparatus is within a reference range or value, wherein information on the capacity of the apparatus includes at least one of:
a combination ratio of an indoor device capacity to an outdoor device capacity; and
a cooling capacity or a heating capacity of the indoor device, and wherein the verification result display displays an error message if the combination ratio is out of the reference range, or the cooling and heating capacities are less than the reference value, which includes a value based on an area of the room and a sensible heat generation of the room;
wherein the installation information display includes a control toolbar display, and wherein the control toolbar display includes the effectiveness inspection selector and further includes a refresh selector, a drawing inspection selector, a drain pipe check selector, a control check selector, and a duct check selector, wherein when the drawing inspection selector is selected, a drawing inspection display including drawing information is displayed, wherein the drawing inspection display includes an option selector to select a type of a structure to be displayed, a drawing configuration information display that displays information on the structure selected by the option selector, and an error information display that displays an error message if a connection configuration of the corresponding structure has an error; wherein when the drain pipe check selector is selected, a drain structure of the drawing inspection display is activated, and a diameter of a drain pipe is configured and is updated on the drawing display; and wherein when the duct check selector is selected, a duct check display is displayed to select a diameter of a duct and a subsidiary model, and to calculate pressure loss values, and drawing relating to an arrangement of the duct is inserted into the drawing display.

2. The system according to claim 1, wherein the verification result includes at least one of information relating to lengths of the pipe materials constituting the air conditioner and information relating to a height difference between the indoor device or the outdoor device.

3. The system according to claim 2, wherein the verification result display displays a limit value relating to the verification information and a current value of an inspection result in order to compare them.

4. The system according to claim 1, wherein a model display including at least one model is displayed to change a model of the apparatus when the error information is displayed, wherein the model of the apparatus is changed through the model display, and wherein an apparatus of the changed model is inserted on the drawing display.

5. The system according to claim 1, wherein the display further includes a selectable duct check selector in order to verify a capacity of a duct or a ventilation device constituting the air conditioner.

6. The system of claim 1, wherein the display further includes a command display arranged at one side of the drawing display in the third area and configured to display predetermined commands input for the air conditioner into the drawing display related to the building.

7. The system of claim 6, wherein the command display displays characters or symbols input by a user, and wherein the user selects the displayed characters or symbols, or inputs new characters or symbols to execute a predetermined command.

8. The system of claim 1, wherein the product information display includes a product selector that displays the configuration of the air conditioner including the outdoor device, the indoor device, and the pipe materials, and wherein the product information display displays the configuration of the selected outdoor device, the indoor device, and the pipe materials.

9. The system of claim 8, wherein the product information display further includes an edit toolbar display that displays tools to arrange, modify, add, and delete functions of the selected outdoor device, the indoor device, and the pipe materials.

10. The system of claim 9, wherein the product information display further includes an automatic arrangement selector that arranges the selected outdoor device, the indoor device, and the pipe materials on the drawing display.

11. The system of claim 1, wherein when the refresh selector is selected, the installation process information for installing the air conditioner is updated.

12. The system of claim 1, wherein when the control check selector is selected, a control button of the drawing inspection display is activated, and the drawing inspection display displays a cable length based on a central control line of the air conditioner and a quantity of the indoor device connected to a controller.

* * * * *